United States Patent [19]

Ishii et al.

[11] Patent Number: 5,671,099
[45] Date of Patent: Sep. 23, 1997

[54] MAGNETIC RECORDING APPARATUS WITH POWER CONSERVATION FEATURE

[75] Inventors: Shuichi Ishii; Fubito Igari, both of Tokyo, Japan

[73] Assignee: Kabushiki Kaisha Toshiba, Kawasaki, Japan

[21] Appl. No.: 530,475

[22] Filed: Sep. 19, 1995

[30] Foreign Application Priority Data

Sep. 7, 1995 [JP] Japan ................................. 7-230123

[51] Int. Cl.$^6$ ................................................ G11B 19/02
[52] U.S. Cl. .................. 360/69; 360/60; 360/78.14; 360/67; 360/75; 395/750; 364/707; 364/273.1
[58] Field of Search .............................. 364/707, 273.1; 360/60, 69, 78.14, 67, 61, 7, 68, 75; 369/60; 365/227; 395/750

[56] References Cited

U.S. PATENT DOCUMENTS

| | | | |
|---|---|---|---|
| 4,688,112 | 8/1987 | Shoji et al. | 360/60 |
| 4,709,279 | 11/1987 | Sano | 360/69 X |
| 4,737,867 | 4/1988 | Ishikawa et al. | 360/75 X |
| 4,777,545 | 10/1988 | Shoji | 360/67 X |
| 5,345,347 | 9/1994 | Hopkins et al. | 360/75 |
| 5,367,638 | 11/1994 | Niessen | 365/227 X |
| 5,521,854 | 5/1996 | Kadowaki | 364/707 |

Primary Examiner—Aristotelis M. Psitos
Assistant Examiner—Alan Faber
Attorney, Agent, or Firm—Finnegan, Henderson, Farabow, Garrett & Dunner, L.L.P.

[57] ABSTRACT

The magnetic recording apparatus according to the present invention comprises a recording medium in which servo information items are provided on tracks at a predetermined interval, a head for scanning the tracks of the recording medium, a read/write circuit for reading/writing data with respect to each of recording units on the recording medium through the head, a servo circuit for sequentially reading the servo information items through the head, a first control section for performing control on the basis of the servo information items read out by the servo circuit such that drive power is supplied to the read/write circuit, a predetermined time period before a time point when the read/write circuit starts reading/writing of data with respect to a target recording unit, and a second control section for preventing supply of the drive power to the read/write circuit, upon completion of the reading/writing of the data by the read/write circuit.

12 Claims, 4 Drawing Sheets

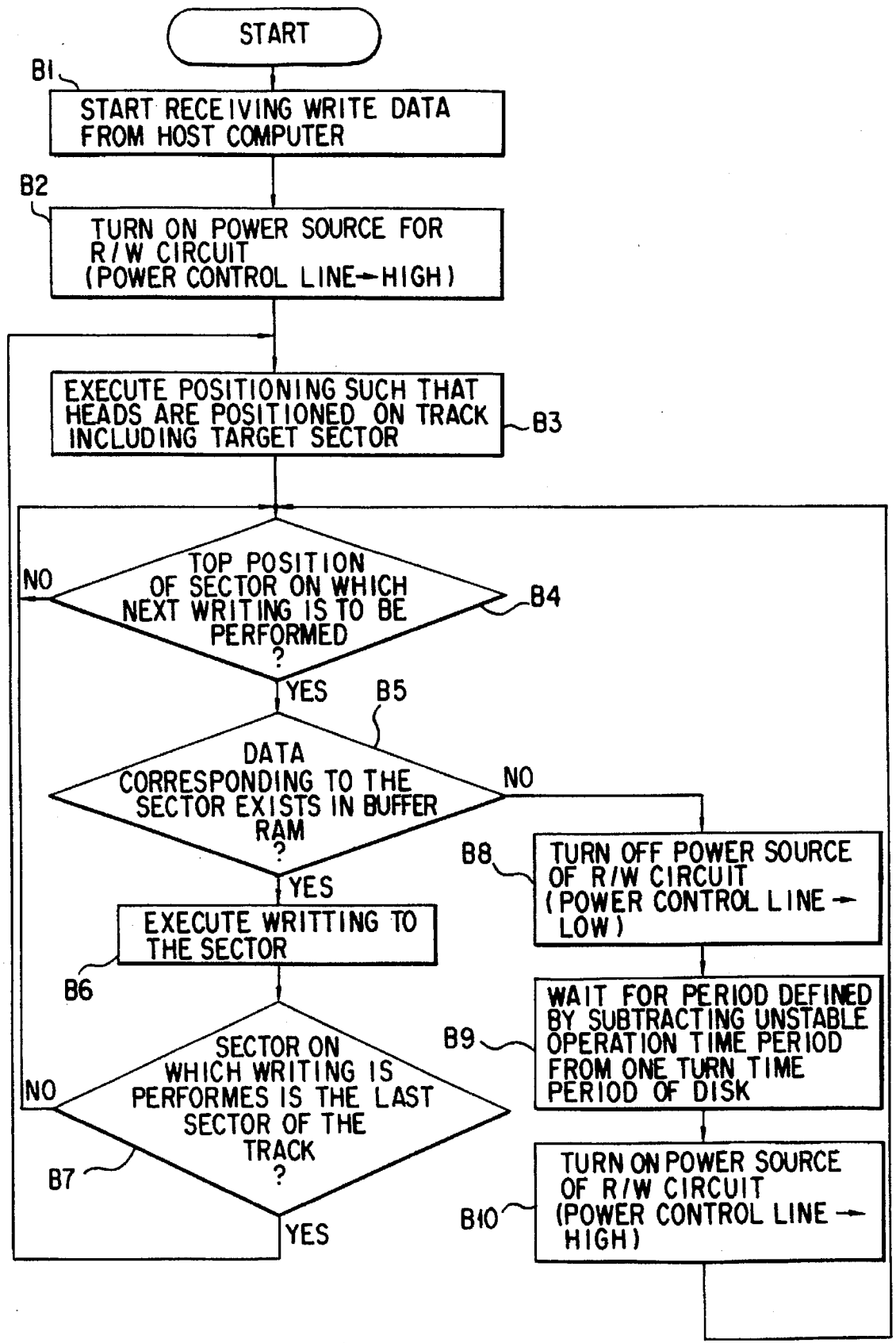
F I G. 5

MAGNETIC RECORDING APPARATUS WITH POWER CONSERVATION FEATURE

BACKGROUND OF THE INVENTION

1. Field of the Invention

The present invention relates to a magnetic recording apparatus, and particularly, to a magnetic recording apparatus which adopts an ID-less method in which a sector start mark, sector address information, or the like is not recorded at the top of each sector forming a recording unit of a recording medium.

2. Description of the Related Art

A read/write circuit mounted on a magnetic recording apparatus performs read/write processing onto a recording medium. This read/write circuit internally includes a clock generator circuit, a clock synchronizer circuit for synchronization with a reading frequency, a data encode/decode circuit, a PRML (Partial Response Maximum Likelihood) circuit, and the likes. While the power source for the read/write circuit is turned on, these internal circuits consume electric power.

To carry out read/write processing by a conventional circuit, the power source for the read/write circuit is turned on (or the power source has been already turned on), and thereafter, positioning of its head is performed such that the head is situated above the track which includes a target sector (i.e., seeking is performed). Search or read/write operation is then performed. Otherwise, the power source for the read/write circuit is performed after the positioning of the head is completed, and thereafter, search for a target sector is directly carried out.

In any of methods as described above, regardless of whether access to the sector is performed or not, the power source of the read/write circuit is always on while positioning to a target track is performed. This means that electric power is wasted by the read/write circuit until reading/writing is started or after reading/writing.

This wasteful power consumption frequently occurs in magnetic recording apparatuses which have a read a head cache function or a write cache function. For example, if a host computer which receives read-out data operates at a low processing speed, then while read processing is performed, there occurs a situation that a buffer RAM for temporarily storing the read-out data cannot store all the read-out data. Similarly, if a host computer operates at a low processing speed while write processing is performed, then there occurs a situation that a buffer RAM for temporarily storing write-in data does not include write data to be written in.

Once such situations have occurred, reading/writing cannot continuously be achieved until the medium is rotated and the sector whose reading/writing has been waited comes to the position of a header. Thus, rotation of the recording medium must be waited. While waiting the rotation of the recording medium, wasteful power supply for the read/write circuit is continued. Consequently, electric power for a time one turn of rotation of the recording medium is wasted in the read/write circuit.

SUMMARY OF THE INVENTION

Accordingly, the present invention has an object of preventing electric power wastefully consumed by a read/write circuit and the likes while reading/writing with respect to a recording medium is not actually performed, in execution of read/write processing.

According to a first aspect of the present invention, a magnetic recording apparatus comprises: a magnetic recording apparatus comprising: a recording medium in which servo information items are provided on tracks at a predetermined interval; scanning means for scanning the tracks of the recording medium; read/write means for reading/writing data with respect to each of recording units on the recording medium through the scanning means; read means for sequentially reading the servo information items through the scanning means; first control means for performing control on the basis of the servo information items read out by the read means such that drive power is supplied to the read/write means, a predetermined time period before a time point when the read/write means starts reading/writing of data with respect to a target recording unit; and second control means for preventing supply of the drive power to the read/write means, upon completion of the reading/writing of the data by the read/write means.

According to a second aspect of the present invention, a magnetic recording apparatus comprises: a recording media; scanning means for scanning tracks of the recording medium; read/write means for reading/writing data with respect to each of recording units on the recording medium through the scanning means; a buffer memory for temporarily storing data transferred between the read/write means and an external device; monitor means for detecting that the buffer memory is in a situation in which the buffer memory cannot store data any more when the read/write means performs reading, and that the buffer memory is in a situation in which data is not stored in the buffer memory when the read/write means performs writing; first control means for performing control such that supply of drive power to the read/write means is prevented, in response to detection by the monitor means; and second control means for performing control such that the read/write means is supplied with the drive power, a predetermined time period before a time point when reading/writing of data is started again with respect to a recording unit on which the read/write means failed to perform reading/writing.

In the above structure, electric power consumed by the read/write circuit while reading/writing is not actually performed is minimized when read/write processing is performed.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a flow-chart showing operation of the magnetic recording apparatus according to the second embodiment.

DETAILED DESCRIPTION OF THE PREFERRED EMBODIMENTS

In the following, embodiments of the present invention will be explained with reference to the drawings.

(First Embodiment)

Figure 1:
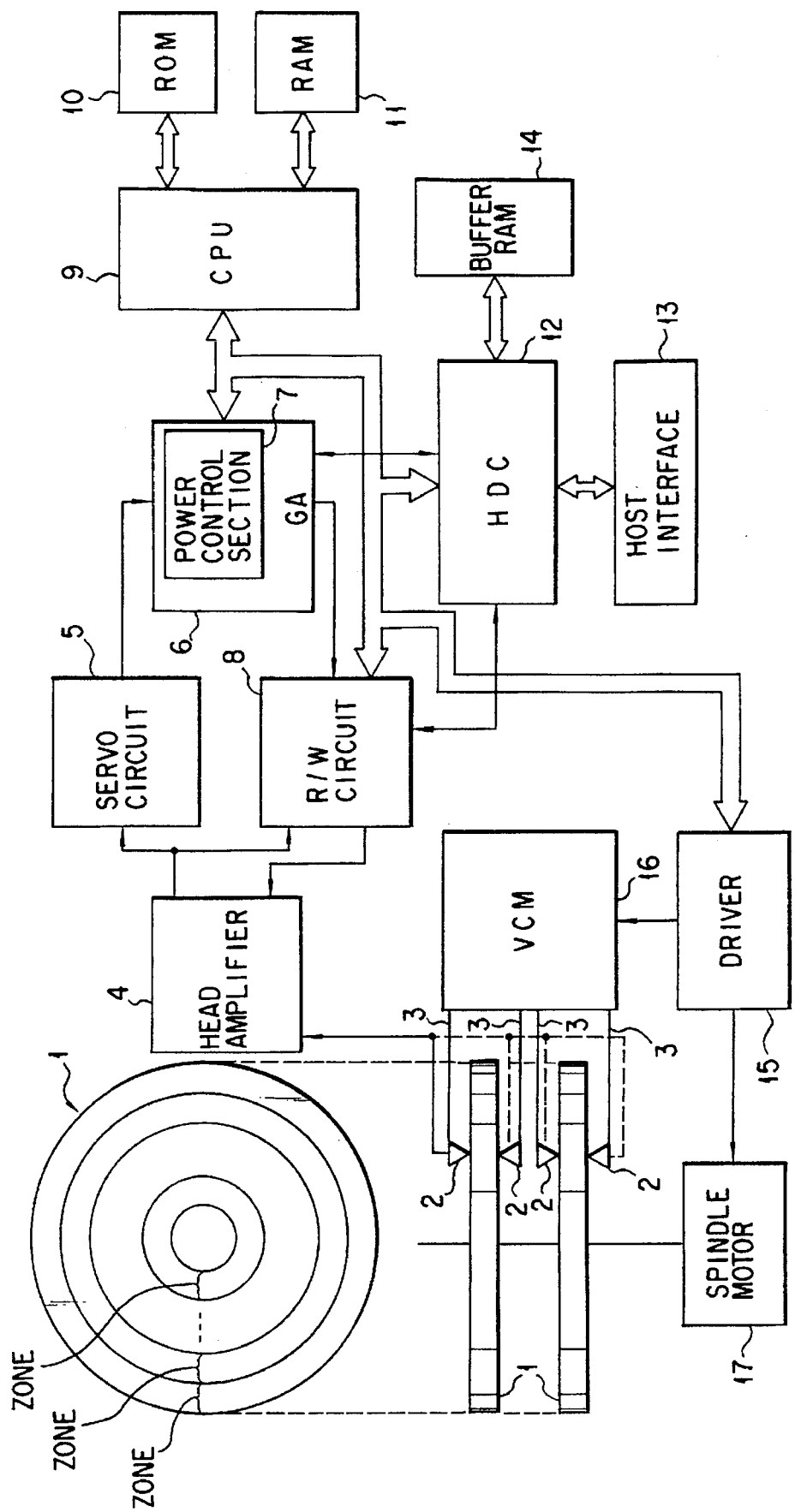
FIG. 1 is a block diagram showing the entire structure of a magnetic recording apparatus according to first and second embodiments.

FIG. 1 is a block diagram showing the entire structure of the magnetic recording apparatus according to the first embodiment of the present invention. This magnetic recording apparatus adopts a method (or an ID-less method) in which a sector start mark, selector address information or the like is not recorded at the top of each recording unit on a recording medium.

As shown in this figure, the magnetic disk apparatus comprises a plurality of disks (or one disk) 1 as a magnetic recording medium. Each of the disks 1 has recording surfaces (both of two surfaces) which are divided into a plurality of concentric zones. Further, each of the zones is divided into a plurality of tracks (not shown). Each track is divided into a plurality of sectors (or recording units). In addition, as will be described later, a plurality of servo information items necessary for positioning are provided at a predetermined interval on each track. Each servo information item includes an address of its servo sector. In addition, burst data and the like which indicate a corresponding cylinder address and a positional error thereof in the cylinder are included in each servo information item.

Further, two heads 2 are provided so as to respectively face both surfaces of each disk 1. Each of the heads 2 is installed on a carriage (or head moving mechanism) 3, and moves in the radial direction of the disks 1 in accordance with the rotation of the carriages 3. Each of the heads 2 are thus positioned on a predetermined track.

Having been thus positioned, each of the heads 2 scan the track by rotating operation of the disk 1. In addition, each of the heads 2 sequentially reads address information items on the track by thus scanning the track. Each of the heads 2 further performs reading/writing of data with respect to each sector by thus scanning the track. The address information and read data are sent to a head amplifier 4. When data is sent from the head amplifier 4 to heads 2 then, the head 2 write the data into sectors.

The head amplifier 4 amplifies read data and the like supplied from the heads 2. In addition, the head amplifier 4 performs predetermined signal processing on write data sent from the read/write circuit (which will be referred to as an R/W circuit) 8, and supplies the write data to the heads 2.

A servo circuit 5 extracts servo information (including a servo sector address) supplied from the head amplifier 4, and supplies the servo information to a gate array circuit (GA) 6. The gate array circuit 6 receives servo information supplied from the servo circuit 5, and supplies the servo information to a CPU (Central Processing Unit) 9 or an HDC (Hard Disc Controller) 12. In addition, the gate array circuit 6 grasps the position of each sector, on the basis of servo information supplied from the servo circuit 5. Specifically, a sector pulse is generated by a sector pulse generator circuit (not shown) at the time point when the heads 2 reaches each sector in the gate array circuit 6.

In addition, the gate array 6 has a power control section 7. This power control section 7 determines the timing at which the read/write circuit 8 is switched to the operation mode/low power mode. Note that, in the operation mode, the read/write circuit 8 is kept supplied with drive power (i.e., the power source is turned on). In the low power mode, power supply to the read/write circuit 8 is prevented (i.e., the power source is turned off.) The power source of the read/write circuit 8 is not completely cut off, but is brought into a low power supply mode, since the read/write circuit 8 is immediately rendered operational when the circuit is switched to the operation mode.

In addition, a processing procedure for controlling power is previously set in the power control section 7, by a firm-ware controlled by the CPU 9. By carrying out this processing procedure, the timing when drive power supply to the read/write circuit 8 is determined.

Figure 2:
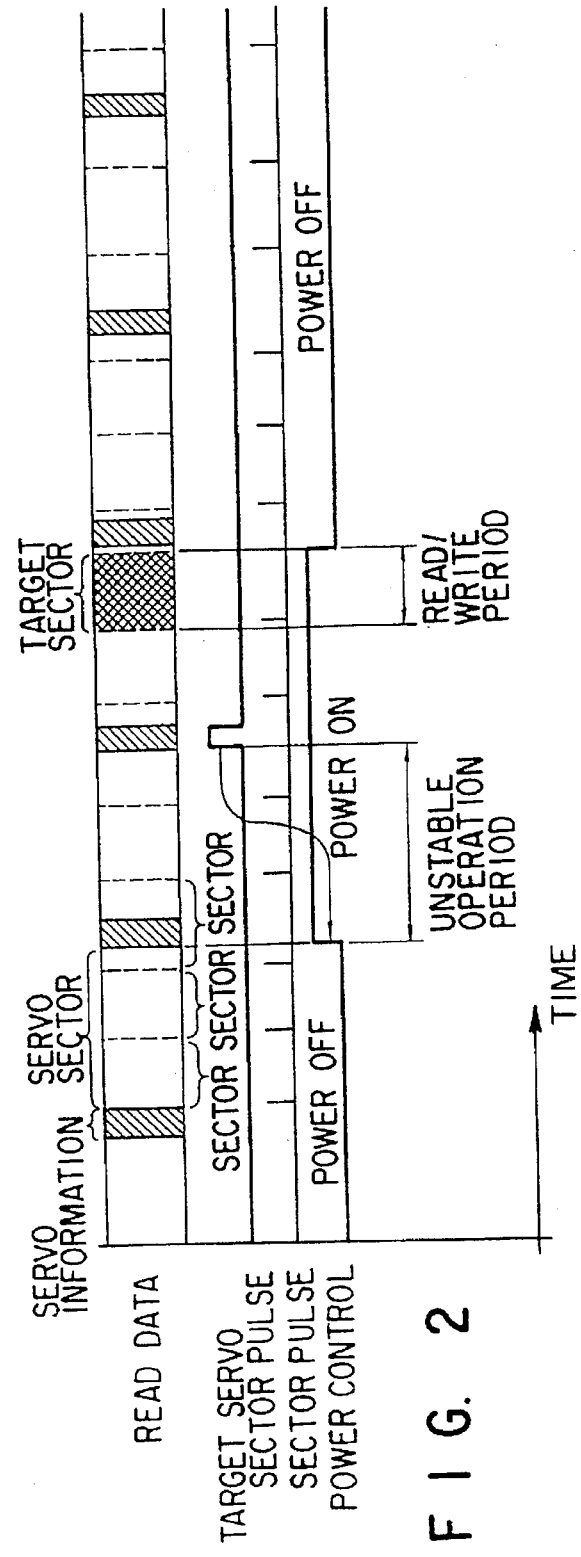
FIG. 2 explains on/off operation with respect to the power source of the read/write circuit in the magnetic recording apparatus according to the first embodiment.

Specifically, the power control section 7 performs control such that the read/write circuit 8 is switched from a low power mode to an operation mode at the time point when the top position of the servo sector positioned prior to the servo sector in which a sector as a reading/writing target reaches the heads 2 (see FIG. 2). This control is performed in order to ensure that after the operation of the read/write circuit 8 becomes unstable at the time when the power source for the read/write circuit 8 is turned on, and then, the read/write circuit 8 recovers a condition in which the operation of the R/W circuit 8 is stable.

In the present embodiment, it is supposed that the time period for which the read/write circuit 8 is rendered unstably operational due to turning on of the power source is equal to or shorter than a time period equivalent to one servo sector.

The CPU 9 controls operation of the entire magnetic recording apparatus. The CPU 9 uses a firm-ware stored in a ROM 10, to set a processing procedure for controlling power for the read/write circuit 8. In addition, the CPU 9 temporarily stores, into a RAM 11, information and data necessary for various processing. The CPU 9 supplies predetermined command signals to the gate array circuit 6, the read/write circuit 8, the HDC 12, and the driver 15. For example, the CPU 9 supplies a command to the driver 15 so that a VCM (Voice Coil Motor) 16 and a spindle motor 17 performs predetermined drive operation or so that the read/write circuit 8 performs reading/writing of data .at a predetermined frequency.

The read/write circuit 8 extracts read data amplified by the head amplifier 4, and performs processing necessary for data reproduction processing. In addition, the read/write circuit 8 performs signal processing necessary for data record processing, and supplies the heads 2 with a write current corresponding to write data.

An HDC 12 serves to sequentially send the read/write circuit 8 with write data sent from a host computer (not shown) through a host interface 13, and serves to sequentially send the host computer with read data supplied from the read/write circuit 8 through the host interface. Note that data transfer between the read/write circuit 8 and the buffer RAM 14 is performed by a data transfer control circuit (not shown) in the HDC 12.

When the HDC 12 receives a series of write data from the host interface 13, the HDC notifies the CPU 9 of the receipt of the data, and makes the buffer RAM 14 temporarily store the write data and then sequentially sends the write data to the read/write circuit 8. Meanwhile, when the HDC 12 receives a series of read data from the read/write circuit 8, the HDC 12 notifies the CPU 9 of the receipt of the data, and simultaneously, makes the buffer RAM 14 temporarily store the read data, and then sequentially sends the read data to the host interface 13.

Note that a target sector detect circuit (not shown) for detecting a target sector is provided in the HDC 12.

A driver 15 performs control in response to a command from a CPU 9, such that the VCM 16 and the spindle motor 17 perform predetermined drive operation. The driver 15 controls operation of the VCM 16 so as to move a carriage 3 in the radial direction of the disks 1. In this case, the driver 15 moves the carriage 3 such that the heads 2 scan the track which includes a target sector.

In the same way, the driver 15 controls operation of the spindle motor 17 so as to rotate the disks 1. The spindle motor 17 makes the disks 1 rotate at a predetermined angle speed.

Figure 3:
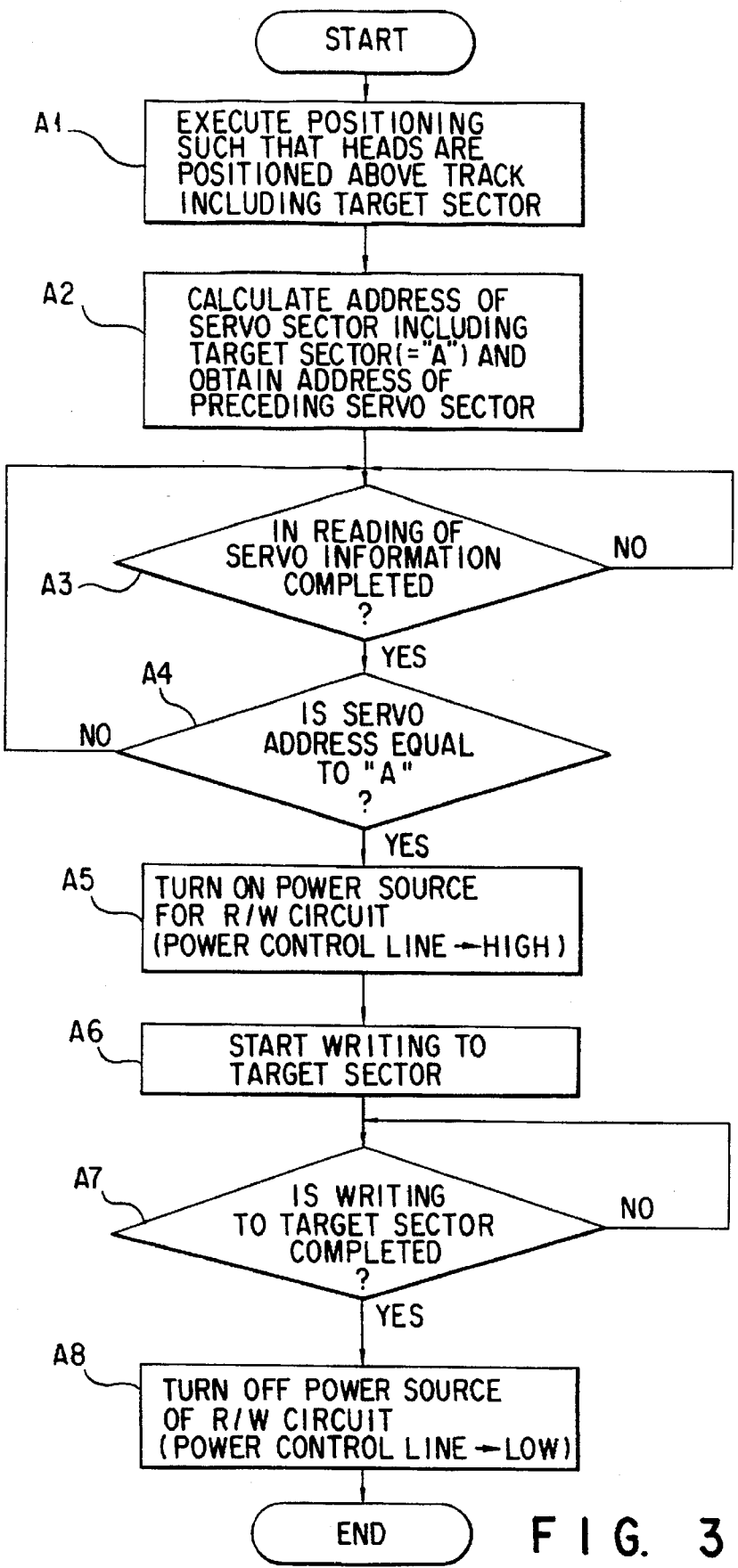
FIG. 3 is a flow-chart showing the operation of the magnetic recording apparatus according to the first embodiment.

Next, operation of the magnetic record apparatus is explained with reference to the flow-chart shown in FIG. 3. Note that the following explanation will mainly be made to write processing.

Here, it is supposed that all the components forming a magnetic record apparatus except for the read/write circuit 8 are kept supplied with electric power.

At first, the VCM 16 responds to a command supplied from the CPU 9 through the driver 15, and performs positioning such that the heads 2 are positioned above the track which includes a target sector (step A1). In addition, after completion of this positioning, the heads 2 scan the track and sequentially sends servo information items on the track to the servo circuit 5 through the head amplifier 4.

Meanwhile, a power control section 7 in which a processing procedure has been set by a firm-ware obtains an address of the servo sector corresponding to a target sector (on which the read/write circuit 8 performs reading/writing). The power control section 7 further obtains an address (=A) of another servo sector which is positioned prior to the target servo sector, on the bases of the address thus obtained (step A2).

The servo circuit 5 sequentially reads the servo information items supplied through the head amplifier 4, and sends the servo sector addresses included in the servo information items to the power control section 7. When reading of the servo information items is thus completed (step A3), the power control section 7 determines whether or not the servo sector addresses sent from the servo circuit 5 are equal to the address A (step A4). Unless reading of servo information items is completed, the power control section 7 waits until the reading is completed.

If the servo sector addresses are not equal to the address A, the power control section 7 waits until next servo information items are read out and the servo sector addresses included therein are sent.

Meanwhile, if any of the servo sector addresses sent from the servo circuit 5 is equal to the address A, the power control section 7 turns on the power source of the read/write circuit 8 (step A5). As a result of this, unstable operation of the read/write circuit 8 caused when the power source is turned on is eliminated and the read/write circuit 8 recovers a condition in which operation is stable, before the heads 2 scan a target sector.

Then, the read/write circuit 8 responds to a command from the HDC 12, and starts writing data into a target sector (step A6). When the writing of data into the target sector is completed (step A7), the power control section 7 turns off the power source for the read/write circuit 8 (step A8). Note that, unless writing into a target sector is completed, the power control section 7 waits until the writing into the target sector is completed.

Note that operation which is performed in read processing is the same as the operation in the write processing explained above.

As has been described above, according to the first embodiment, the power control section 7 performs control on the basis of servo information items provided on tracks of the disks 1, such that the read/write circuit 8 is supplied with drive power, at a predetermined time period before a time point when the read/write circuit 8 starts reading/writing with respect to a target sector. In addition, the power control section 7 performs control such that drive power supply to the read/write circuit 8 is prevented in response to completion of reading/writing performed by the read/write circuit 8. In this manner, wasteful electric power consumption is prevented while reading/writing with respect to disks 1 is not actually performed.

The present invention is not limited to the first embodiment described above, but can be variously modified and practiced within the scope of the subject matter of the present invention.

For example, in the above explanation of the first embodiment, the power source of the read/write circuit 8 is turned on at the time point when the heads 2 are scanning a sector preceding, by one servo sector, the top position of the servo sector which includes a target sector. However, the present invention is not limited hereto, but the time point when the read/write circuit 8 is turned on may be shifted to be slightly late if the period of an unstable operation is short.

In addition, although the first embodiment has been explained as using a firm-ware to perform setting processing of the timing when the read/write circuit 8 is powered on, a hard-ware may be used in place of the firm-ware.

In the above explanation to the first embodiment, the timing when the read/write circuit 8 is powered on is set on the basis of servo information items. However, this timing may be set on the basis of disk rotation angle information depending on a counter-electromotive force caused by the spindle motor 17.

(Second Embodiment)

The entire structure of the magnetic recording apparatus according to the second embodiment is substantially the same as that shown in FIG. 1. Therefore, this second embodiment will be explained with reference to FIG. 1, and explanation of those components which are common to the first embodiment will be omitted while those points which are different from the first embodiment will be explained.

When a situation occurs in which the buffer RAM 14 cannot store data any more during read processing, the read/write circuit 8 does not perform reading, and therefore, it is not necessary to supply the read/write circuit 8 with drive power. Similarly, when a condition occurs in which data is not stored in the buffer RAM 14 during write processing, the read/write circuit 8 does not perform writing, and therefore, it is not necessary to supply the read/write circuit 8 with drive power. In this second embodiment, turning on/off of the power source for the read/write circuit 8 is controlled on the basis of the view points as described above.

A monitor section (not shown) for monitoring the data amount of the buffer RAM 14 is provided in the HDC 12. When a condition occurs in which data is not stored in the buffer RAM 14 in the read processing, the monitor section notifies the CPU 9 of the condition. Further, when a condition occurs in which data is not stored in the buffer RAM 14 in the write processing, the CPU 9 notifies the CPU 9 of it.

Figure 4:
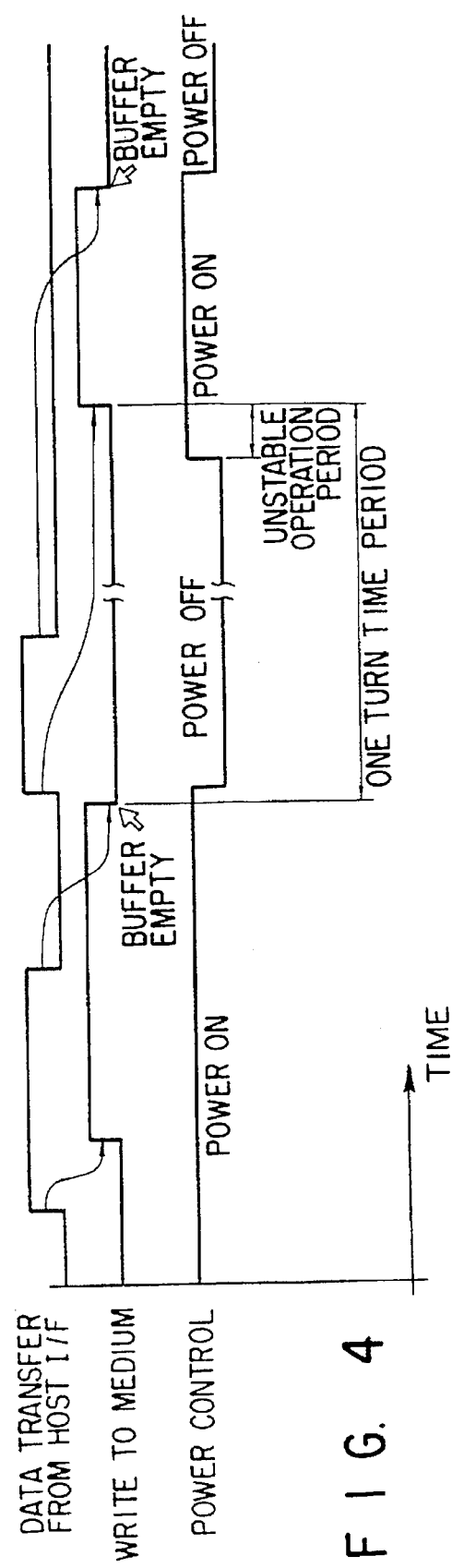
FIG. 4 explains on/off operation with respect to the power source of the read/write circuit in the magnetic recording apparatus according to the second embodiment.

When the CPU 9 receives one of the above two notifications, the CPU 9 supplies a command for the power control section 7 so as to turn off the power source for the read/write circuit 8. Simultaneously, the CPU 9 waits until a predetermined time period passes with use of an internal timer (not shown). After the predetermined time period has passed, the CPU 9 supplies a command to the power control section 7 so as to turn on the power source of the read/write circuit 8. Thus, the CPU 9 waits for a time period defined by subtracting an unstable operation time period (for which operation of the read/write circuit 8 is rendered unstable due to turning-on of the power source) from a one-turn time period which the disk 1 takes to rotate by one turn (see FIG. 4.) The power control section 7 turns on/off the power source for the read/write circuit 8 in response to commands from the CPU 9.

In the next, operation of the above magnetic recording apparatus will be explained with reference to the flow-chart shown in FIG. 5. Note that the following explanation will be made mainly to data write operation.

Here, it is supposed that all the components forming the magnetic recording apparatus is now kept supplied with power, except for the read/write circuit 8.

At first, the HDC 12 starts receiving write data sent through a host interface 13 from a host computer (step B1). In this stage, the HDC 12 notifies the CPU 9 of that receipt of write data is started. In response to this notification, the CPU 9 supplies the power control section 7 with a command so that the power control section 7 turns on the power source for the read/write circuit 8. In this manner, the power control section 7 turns on the power source for the read/write circuit 8 (step B2.)

Next, the VCM 16 positions the heads 2 above the track which includes a target sector, in response to a command supplied through the driver 15 from the CPU 9 (step B3.) Note that the heads 2 scan the track upon completion of the positioning.

Further, the power control section 7 determines whether or not the heads 2 are situated at the top position of the sector into which data is to be written, on the basis of servo information supplied through the servo circuit 5 (step B4). The power control section 7 waits until the top position reaches the heads, if the top position does not yet reaches there.

If the heads 2 are situated at the top position of the sector, the power control section 7 notifies the HDC 12 of it. In response to this notification, the monitor section in the HDC 12 determines whether or not data corresponding to the sector is included in the buffer RAM 14 (step B5). If the data is included in the buffer RAM 14, the HDC 12 supplies a command to the read/write circuit 8 so as to write data into the sector. In this manner, the read/write circuit 8 writes the data into the sector (step B6).

The power control section 7 determines whether or not the sector on which writing is completed is the last sector of the track (step B7). If the sector on which writing is completed is not the last sector of the track, the processing returns to the step B4. Meanwhile, if the sector on which writing is completed is the last sector of the track, the processing returns to the step B3.

If data is not included in the buffer RAM 14 in the step B5 described above, the HDC 12 notifies the CPU 9 of it. In response to this notification, the CPU 9 supplies a command to the power control section so as to turned off the power source to the read/write circuit 8. In this manner, the power control section turned off the power source for the read/write circuit 8 (step B8). The CPU 9 supplies a command to the power control section 7 so as to turn on the power source for the read/write circuit 8 and to supply drive power, a predetermined time period before the time point when writing is performed again on the sector into which the read/write circuit 8 has once failed to write data. Specifically, the CPU 9 waits for a time period defined by subtracting an unstable operation time period from one turn time period which the disk 1 takes to rotate by one turn (step B9).

Then, the power control section 7 turns on the power source for the read/write circuit 8 (step B10), and returns to the processing of the step B4. In this manner, unstable operation of the read/write circuit 8 caused when turning on the power source is eliminated and the read/write circuit 8 recovers stable operation, before a header scans a target sector.

As has been explained above, according to the second embodiment, the power control section 7 performs control such that supply of drive power to the read/write circuit 8 is prevented when the buffer RAM 14 cannot store data any more in read processing and when data is not stored in the buffer RAM 14 in write processing. In addition, the power control section 7 performs control such that drive power is supplied to the read/write circuit 8, a predetermined time period before the time point when the read/write circuit 8 starts reading/writing again with respect to the sector on which the read/write circuit 8 failed to complete reading/writing. In this manner, it is possible to prevent power wastefully consumed by the read/write circuit 8, while the read/write circuit 8 cannot read/write data and waits until the disk 1 rotates by one turn.

The present invention is not limited to the above second embodiment, but can be variously modified and practiced within the scope of the subject matter of the present invention.

For example, the second embodiment may be arranged such that the power source for the read/write circuit 8 is turned off when an error occurs in reading/writing data with respect to the disks 1 and a retry must be carried out. This is because another one turn of the disks 1 is waited before a retry is performed.

In addition, the second embodiment has been explained with reference to the case where the present invention is adopted to the magnetic recording apparatus of an ID-less method, but the present invention may be adopted to a magnetic recording apparatus of an ID method. This is because ID-search need not be carried out when rotation of a disk is waited, since a target sector basically does not reach a head until the disk rotates by one turn. However, in case where sector substitutional processing is performed with respect to a defective sector, the position where the substitutional sector exists sometimes is different from a normal position, and therefore, the time period for waiting for rotation of the disk is not always equal to one turn of rotation of the disk.

The above explanation to the above first and second embodiments has been made to a case in which a read/write circuit is kept in a low power mode (in which the power source is turned off) while reading/writing of data is not performed with respect to disks, in order to lower the power consumption in a magnetic recording apparatus. Furthermore, the other components may also be kept in a low power mode (in which the power source is turned off).

For example, a data transmit circuit in an HDC 12 need not be operated while reading/writing is not performed by the read/write circuit 8, and therefore, the power source for associated circuits in the side from which data is transmitted may be turned off. Further, in case where an magnetic recording apparatus adopts an ID-less method, the power source for a sector pulse generator circuit (in the gate array circuit 6) may be turned off. Furthermore, the power source for a target sector detect circuit (in the HDC 12) for detecting a target sector may be turned off.

In addition, for a time period in which servo control and data transmission are not performed, corresponding processing in the CPU 9 may be stopped. In this case, the ROM 10 which stores execution program for the CPU 9 may be stopped likewise. Further, while write data is not included in the buffer RAM 14 in write processing, it is not necessary to maintain the contents of data, and therefore, the power source for the buffer RAM 14 may be turned off.

As has been specifically described above, according to the present invention, it is possible to prevent a read/write circuit and the likes from wastefully consuming electric power while reading/writing (except for reading servo information) is not actually performed with respect to a recording medium, in execution of read/write processing.

What is claimed is:

1. A magnetic recording apparatus comprising:

a recording medium in which servo information items are provided on tracks at a predetermined interval;

scanning means for scanning the tracks of the recording medium for recording information;

read/write means for reading/writing data with respect to each of a plurality of recording units on the recording medium through the scanning means;

read means for sequentially reading the servo information items supplied through the scanning means; and control means for performing control on the basis of the servo information items read out by the read means such that drive power is supplied to the read/write means for a predetermined time period before a time point when the read/write means starts reading/writing of data with respect to a target recording unit, and for preventing supply of the drive power to the read/write means upon completion of the reading/writing of the data by the read/write means.

2. A magnetic recording apparatus according to claim 1, wherein the read/write means is in an operation mode while the drive power is supplied, and is in a lower power mode while supply of the drive power is prevented.

3. A magnetic recording apparatus according to claim 2, wherein the control means performs control such that supply of drive power for a buffer memory for temporarily storing data which the read/write means reads/writes is prevented when the supply of the drive power for the read/write means is prevented.

4. A magnetic recording apparatus according to claim 1, wherein the control means performs control such that supply of drive power for a circuit for controlling data transfer between the read/write means and a buffer memory is prevented when the supply of the drive power for the read/write means is prevented.

5. A magnetic recording apparatus according to claim 1, wherein the control means performs control such that supply of drive power for a circuit for generating a sector pulse on the basis of the servo information items is prevented when the supply of the drive power for the read/write means is prevented.

6. A magnetic recording apparatus according to claim 1, wherein the control means performs control such that supply of drive power for a circuit for detecting the target recording unit is prevented when the supply of the drive power for the read/write means is prevented.

7. A magnetic recording apparatus comprising:

a recording medium;

scanning means for scanning tracks of the recording medium for recording information;

read/write means for reading/writing data with respect to each of a plurality of recording units on the recording medium through the scanning means;

a buffer memory for temporarily storing data transferred between the read/write means and an external device;

a controller for detecting that the buffer memory is in a situation in which the buffer memory cannot store data any more when the read/write means performs reading, and that the buffer memory is in a situation in which data is not stored in the buffer memory when the read/write means performs writing; and control means for performing control such that supply of drive power to the read/write means is prevented, in response to detection by the controller that the buffer memory cannot store data, and for performing control such that the read/write means is supplied with the drive power for a predetermined time period before a time point when reading/writing of data is started again with respect to a recording unit on which the read/write means failed to perform reading/writing.

8. A magnetic recording apparatus according to claim 7, wherein the read/write means is in an operation mode while the drive power is supplied, and is in a lower power mode while supply of the drive power is prevented.

9. A magnetic recording apparatus according to claim 8, wherein the control means performs control such that supply of drive power for the buffer memory is prevented when the supply of the drive power for the read/write means is prevented.

10. A magnetic recording apparatus according to claim 7, wherein the control means performs control such that supply of drive power for a circuit for controlling data transfer between the read/write means and the buffer memory is prevented when the supply of the drive power for the read/write means is prevented.

11. A magnetic recording apparatus according to claim 7, wherein the control means performs control such that supply of drive power for a circuit for generating a sector pulse on the basis of servo information items is prevented when the supply of the drive power for the read/write means is prevented.

12. A magnetic recording apparatus according to claim 7, wherein the control means performs control such that supply of drive power for a circuit for detecting a target recording unit is prevented when the supply of the drive power for the read/write means is prevented.

* * * * *